United States Patent
Miller et al.

(10) Patent No.: US 10,263,770 B2
(45) Date of Patent: Apr. 16, 2019

(54) DATA PROTECTION IN A STORAGE SYSTEM USING EXTERNAL SECRETS

(71) Applicant: PURE STORAGE, INC., Mountain View, CA (US)

(72) Inventors: Ethan Miller, Santa Cruz, CA (US); John Colgrove, Los Altos, CA (US); John Hayes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/073,618

(22) Filed: Nov. 6, 2013

(65) Prior Publication Data

US 2015/0127946 A1 May 7, 2015

(51) Int. Cl.
*H04L 9/08* (2006.01)
*G06F 21/62* (2013.01)

(52) U.S. Cl.
CPC ........ *H04L 9/0822* (2013.01); *G06F 21/6218* (2013.01); *H04L 9/085* (2013.01); *H04L 9/0897* (2013.01); *G06F 2221/2107* (2013.01)

(58) Field of Classification Search
CPC ...... H04L 9/0897; H04L 9/08; G06F 21/6218
USPC ....................... 713/155, 156, 171
See application file for complete search history.

(56) References Cited

U.S. PATENT DOCUMENTS

| | | | |
|---|---|---|---|
| 4,924,514 A | 5/1990 | Matyas et al. |
| 5,208,813 A | 5/1993 | Stallmo |
| 5,403,639 A | 4/1995 | Belsan |
| 5,557,765 A | 9/1996 | Lipner et al. |
| 5,940,838 A | 8/1999 | Schmuck et al. |
| 6,035,041 A | 3/2000 | Frankel et al. |
| 6,263,350 B1 | 7/2001 | Wollrath et al. |
| 6,412,045 B1 | 6/2002 | DeKoning et al. |
| 6,470,454 B1 | 10/2002 | Challener et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

PCT Search Report and Written Opinion, dated Feb. 18, 2015; PCT Application No. PCT/US2014/064379.

(Continued)

*Primary Examiner* — Farid Homayounmehr
*Assistant Examiner* — Suman Debnath

(57) ABSTRACT

A system, method, and computer-readable storage medium for protecting a set of storage devices using a secret sharing scheme in combination with an external secret. An initial master secret is generated and then transformed into a final master secret using an external secret. A plurality of shares are generated from the initial master secret and distributed to the storage devices. The data of each storage device is encrypted with a device-specific key, and this key is encrypted using the final master secret. In order to read the data on a given storage device, the initial master secret reconstructed from a threshold number of shares and the external secret is retrieved. Next, the initial master secret is transformed into the final master secret using the external secret, and then the final master secret is used to decrypt the encrypted key of a given storage device.

11 Claims, 5 Drawing Sheets

(56) References Cited

U.S. PATENT DOCUMENTS

| | | |
|---|---|---|
| 6,718,448 B1 | 4/2004 | Ofer |
| 6,757,769 B1 | 6/2004 | Ofer |
| 6,799,283 B1 | 9/2004 | Masaaki et al. |
| 6,834,298 B1 | 12/2004 | Singer et al. |
| 6,850,938 B1 | 2/2005 | Sadjadi |
| 6,915,434 B1 | 7/2005 | Kuroda |
| 6,931,128 B2 | 8/2005 | Roberts |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,225,339 B2 | 5/2007 | Asano et al. |
| 7,599,976 B1 | 10/2009 | Logue et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,037,319 B1 * | 10/2011 | Clifford .............. G06F 21/6218 380/277 |
| 8,086,652 B1 | 12/2011 | Bisson et al. |
| 8,117,464 B1 | 2/2012 | Kogelnik |
| 8,205,065 B2 | 6/2012 | Matze |
| 8,321,682 B1 | 11/2012 | Read et al. |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,718,283 B2 | 5/2014 | Whyte |
| 8,745,415 B2 | 6/2014 | Miller et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0094085 A1 | 7/2002 | Roberts |
| 2002/0159601 A1 | 10/2002 | Bushmitch et al. |
| 2002/0164033 A1 * | 11/2002 | Rajasekaran ............ H04L 9/085 380/278 |
| 2002/0178335 A1 | 11/2002 | Selkirk et al. |
| 2003/0084290 A1 * | 5/2003 | Murty ................. H04L 63/0428 713/168 |
| 2003/0140209 A1 | 7/2003 | Testardi |
| 2004/0049572 A1 | 3/2004 | Yamamoto et al. |
| 2004/0117649 A1 | 6/2004 | Whyte |
| 2005/0033964 A1 | 2/2005 | Albanese |
| 2005/0066095 A1 | 3/2005 | Mullick et al. |
| 2005/0132203 A1 | 6/2005 | Dharmarajan |
| 2005/0216535 A1 | 9/2005 | Saika et al. |
| 2005/0223154 A1 | 10/2005 | Uemura |
| 2005/0268345 A1 | 12/2005 | Harrison et al. |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2007/0300076 A1 | 12/2007 | Diffie et al. |
| 2008/0049942 A1 | 2/2008 | Sprunk et al. |
| 2008/0059699 A1 | 3/2008 | Kubo et al. |
| 2008/0065852 A1 | 3/2008 | Moore et al. |
| 2008/0095375 A1 * | 4/2008 | Tateoka ................. H04L 9/085 380/282 |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0077379 A1 | 3/2009 | Geyzel et al. |
| 2009/0099967 A1 * | 4/2009 | Yokota et al. ................. 705/55 |
| 2009/0177894 A1 | 7/2009 | Orsini et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0189265 A1 * | 7/2010 | Ito ......................... H04L 9/0822 380/285 |
| 2010/0191897 A1 | 7/2010 | Zhang et al. |
| 2010/0215172 A1 | 8/2010 | Schneider |
| 2010/0250802 A1 | 9/2010 | Waugh et al. |
| 2010/0250882 A1 | 9/2010 | Hutchison et al. |
| 2010/0266120 A1 | 10/2010 | Leggette et al. |
| 2010/0281225 A1 | 11/2010 | Chen et al. |
| 2010/0287327 A1 | 11/2010 | Li et al. |
| 2010/0299521 A1 | 11/2010 | Koike |
| 2011/0019818 A1 * | 1/2011 | Ma ............................ G06F 21/32 380/44 |
| 2011/0022574 A1 * | 1/2011 | Hansen ............... G06F 11/2097 707/698 |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0170692 A1 * | 7/2011 | Konrad ................... H04L 9/002 380/260 |
| 2011/0238634 A1 | 9/2011 | Kobara |
| 2011/0246766 A1 | 10/2011 | Orsini et al. |
| 2011/0289383 A1 | 11/2011 | Dhuse et al. |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0166818 A1 | 6/2012 | Orsini |
| 2012/0198175 A1 | 8/2012 | Atkisson |
| 2012/0254622 A1 | 10/2012 | Kanungo |
| 2012/0284534 A1 * | 11/2012 | Yang ....................... G06F 21/77 713/193 |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0091237 A1 * | 4/2013 | Arulambalam ......... H04L 65/60 709/213 |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089683 A1 | 3/2014 | Miller et al. |
| 2014/0089730 A1 | 3/2014 | Watanabe et al. |
| 2014/0101361 A1 | 4/2014 | Gschwind |
| 2014/0143517 A1 | 5/2014 | Jin et al. |

(56) References Cited

U.S. PATENT DOCUMENTS

| | | |
|---|---|---|
| 2014/0172929 A1 | 6/2014 | Sedayao et al. |
| 2014/0201150 A1 | 7/2014 | Kumarasamy et al. |
| 2014/0208112 A1* | 7/2014 | McDonald et al. .......... 713/171 |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0250303 A1* | 9/2014 | Miller et al. ................. 713/171 |
| 2014/0281308 A1 | 9/2014 | Lango et al. |
| 2014/0325115 A1 | 10/2014 | Ramsundar et al. |
| 2015/0134950 A1 | 5/2015 | Colgrove et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| GB | 2344977 A | 6/2000 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO 98/49804 A1 | 11/1998 |
| WO | WO-1999/013403 A1 | 3/1999 |
| WO | WO 03/032133 A2 | 4/2003 |
| WO | WO-2008/102347 A1 | 8/2008 |
| WO | WO-2010/071655 A1 | 6/2010 |

OTHER PUBLICATIONS

Office Action, U.S. Appl. No. 14/076,468, dated Mar. 12, 2015, pp. 1-12.

Final Office Action, U.S. Appl. No. 14/258,826, filed May 8, 2015, pp. 1-29.

International Search Report and Written Opinion in application No. PCT/US2013/061626 dated Feb. 10, 2014 pp. 1-13.

Shamir, et al. "How to Share a Secret", IP.Com Inc., West Henrietta, NY, US, Mar. 30, 2007, XP013119902, ISSN: 1533-0001, pp. 1-9.

Non-Final Office Action in U.S. Appl. No. 13/627,444, dated Dec. 23, 2013, 6 pages.

Notice of Allowance in U.S. Appl. No. 13/627,444, dated Apr. 14, 2014, 5 pages.

Non-Final Office Action in U.S. Appl. No. 14/258,826, dated Jan. 21, 2015, 22 pages.

Resch, et al., "AONT-RS: Blending Security and Performance in Dispersed Storage Systems", FAST'11 Proceedings of the 9th USENIX Conference on File and Storage Technologies, Feb. 15, 2011, 12 pages, USENIX Association Berkeley, CA, USA.

Resch, et al., "AONT-RS: Blending Security and Performance in Dispersed Storage Systems", USENIX.org, 26 pages, <http://www.usenix.org/events/fast11/tech/slides/resch.pdf>. [Retrieved Feb. 25, 2015].

International Search Report and Written Opinion in application No. PCT/US2014/062383, dated Feb. 2, 2015, 10 pages.

Menezes, et al., "Chapter 13: Key Management Techniques", Handbook of Applied Cryptography, Oct. 1, 1996, pp. 543-590, CRC Press, Inc., Boca Raton, FL, USA.

Microsoft Corporation, "GCSettings.IsServerGC Property", Retrieved Oct. 27,2013 via the WayBack Machine, 3 pages.

Microsoft Corporation, "Fundamentals of Garbage Collection", Retrieved Aug. 30, 2013 via the WayBack Machine, 11 pages.

* cited by examiner

DATA PROTECTION IN A STORAGE SYSTEM USING EXTERNAL SECRETS

BACKGROUND

Field of the Invention

This invention relates to storage systems and, more particularly, to a system for securing data from unauthorized access.

Description of the Related Art

Storage systems often store many different types of sensitive information. Therefore, storage systems need to ensure that the stored data cannot be read or otherwise compromised by unauthorized users. Preventing the data from being compromised can prove to be challenging in a variety of scenarios. For example, when the storage devices are shipped between locations, it may be difficult to protect against data being accessed on lost or stolen storage devices. Additionally, in another example, an unauthorized person could steal a single storage device and access the data on the storage device by circumventing or surmounting the security measures being used.

Existing schemes for protecting against these types of scenarios typically fail to fully address these threats to data security. It is important to ensure that unauthorized users are unable to read the data stored in the storage system. Additionally, it is often desirable to be able to make data unreadable quickly and without the need for having the storage devices powered on. Therefore, improved techniques for securing data in a storage system are desired.

In view of the above, improved systems and methods for protecting access to a set of storage devices are desired.

SUMMARY OF EMBODIMENTS

Various embodiments of systems and methods for preventing unauthorized access to data stored in a storage array are contemplated.

In one embodiment, a secret sharing scheme may be combined with one or more external secrets to protect the data stored in a storage array. The secret sharing scheme may protect the storage array by preventing data from being compromised if a small number of storage devices are lost or stolen. To prevent unauthorized data access if the entire storage array is lost, one or more external secrets may be used in combination with the secret sharing scheme to protect the stored data.

In one embodiment, an initial master secret may be generated and then split into a collection of shares, such that possession of a sufficient number of shares enables recovery of the initial master secret, but possession of an insufficient number of shares provides little or no information about the initial master secret. One or more shares may be generated for each storage device of the system, and then the share(s) may be stored on their corresponding storage device. If enough of the storage devices are present, then the initial master secret may be reconstructed from the shares stored on these storage devices. In one embodiment, the initial master secret may be combined with one or more external secrets to generate a final master secret. The external secret(s) may be a password, USB key, key stored on an external server, and/or another type of externally stored secret.

In one embodiment, the data on each storage device may be encrypted with a key, and each storage device may use a separate, unique key to encrypt data on the storage device. Any of a variety of encryption methods may be utilized to encrypt the data on the storage device using the key. In one embodiment, for each storage device, the final master secret and a device-specific value may be used to encrypt the per-drive encryption key. The encrypted key may then be stored on its corresponding storage device. In one embodiment, the device-specific value may be a serial number of the given storage device.

In order to decrypt data in the storage array, the initial master secret may be reconstructed from an adequate number of shares. Also, the one or more external secrets may be retrieved. After the initial master secret has been reconstructed and the one or more external secrets have been located and/or retrieved, the one or more external secrets may be used to transform the initial master secret into the final master secret. Then, each device-specific encrypted key may be decrypted using the final master secret and the device-specific value. These keys may then be used to decrypt the data on the storage devices in the storage array.

Since the data on the storage array is encrypted using a combination of the initial master secret and one or more external secrets, all of these inputs must be present for the data to be decrypted. Therefore, the data stored in the storage array may be easily destroyed by destroying the external secret(s) or making them inaccessible. If a USB key token is used as the external secret, then destroying the USB key token will effectively destroy the data on the storage array. Alternatively, if a smart card is used to store the external secret, then the smart card may be destroyed in order to destroy the data on the storage array. If the external secret is stored on a remote network server, the server may refuse to provide the external secret, which will prevent completion of the steps necessary to decrypt the data stored on the storage array.

These and other embodiments will become apparent upon consideration of the following description and accompanying drawings.

Figure 1:
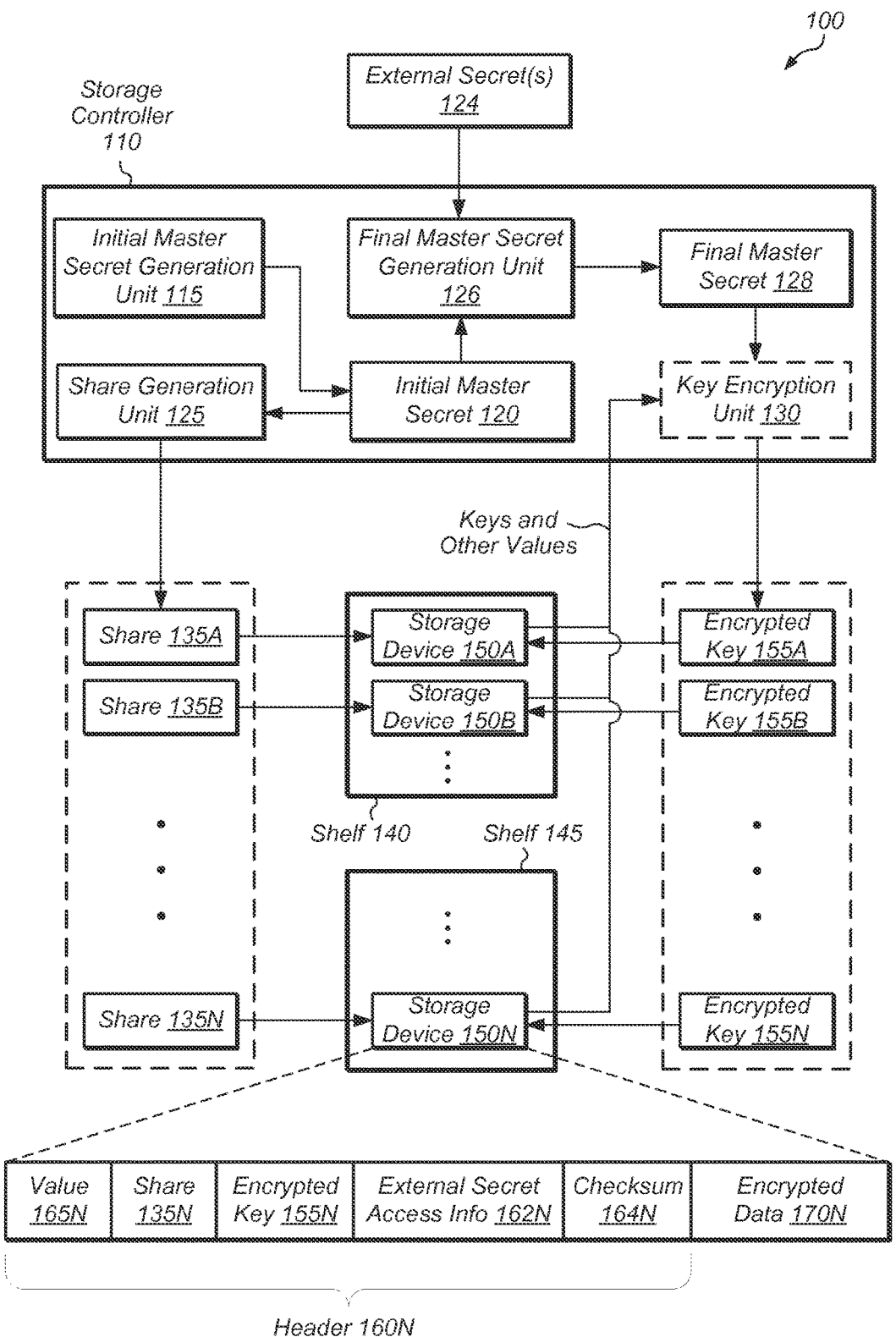
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A computing system comprising a plurality of storage devices . . . ." Such a claim does not foreclose the computing system from including additional components (e.g., a network interface, one or more processors, a storage controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring to FIG. 1, a generalized block diagram of one embodiment of a storage system 100 is shown. The storage system 100 may include storage controller 110 and storage devices 150A-N which are included within shelves 140 and 145. Storage controller 110 may implement a secret sharing algorithm in combination with the use of one or more external secrets 124 to prevent unauthorized access to storage devices 150A-N. Depending on the embodiment, external secret(s) 124 may include password(s), secret(s) stored on universal serial bus (USB) key token(s), secret(s) stored on secure smart card(s), secret(s) stored on remote server(s) accessible by network, and/or secret(s) stored on other device(s).

In one embodiment, initial master secret generation unit 115 may generate initial master secret 120, and shares may be generated from initial master secret 120 by share generation unit 125. Final master secret generation unit 126 may utilize initial master secret 120 and one or more external secrets 124 to generate final master secret 128. In one embodiment, each storage device 150A-N may generate and utilize a key for encrypting the data that is stored on the device. These unencrypted keys may be encrypted using final master secret 128 and a device-specific value. Each of the resultant encrypted keys 155A-N may be stored on a corresponding storage device 150A-N.

In one embodiment, for each type of external secret 124, information about the external secret may be stored on each storage device 150A-N of storage system 100. In another embodiment, information about the external secret may be stored on sufficiently many storage devices so that at least one storage device has this information. This information is shown as external secret access info 162N in the expanded representation of storage device 150N. In one embodiment, each storage device 150A-N may be organized in the same manner as is shown in the expanded representation of storage device 150N.

The external secret access information 162 cannot be used to derive the external secret(s) 124, but the information 162 indicates how the external secret(s) 124 can be obtained. For example, in one embodiment, the information 162 might indicate that external secret 124 is stored on a USB key token and that the initial master secret 120 must be run through the USB key token to provide the final master secret 128. Information 162 may also include an identifier for use with the USB key token. In another embodiment, information 162 may specify a key exchange protocol and the internet protocol (IP) addresses of one or more servers to contact to obtain external secret 124. In this embodiment, information 162 may also specify an identifier to present to the server. In one embodiment, there may be a single set of external secrets 124 for storage system 100. In this embodiment, each storage device 150 may store the same information 162 for obtaining external secrets 124. However, information 162 may vary temporarily on different storage devices 150A-N if an external secret 124 is added or removed.

In some scenarios, it may be possible for incorrect values to be specified for external secrets 124. Therefore, in some embodiments, each storage device 150A-N may store a checksum 164N, and checksum 164N may be used to validate final master secret 128. Checksum 164N may be much smaller than final master secret 128 such that attacks that attempt to calculate final master secret 128 from checksum 164N will fail. In other embodiments, other ways of validating final master secret 128 may be utilized or, alternatively, no attempt may be made to validate final master secret 128.

The data protection scheme illustrated in FIG. 1 makes it straightforward to destroy all of the data stored in storage system 100 by making external secret(s) 124 inaccessible. For example, a USB key token could be physically destroyed in any number of ways, making it impossible to recover external secret 124. An external secret 124 obtained from a key server in a secure location does not need to be destroyed on the server. Rather, the server may refuse to provide external secret 124 to storage system 100, which prevents anyone from reading the data in storage system 100.

As part of the overall data protection scheme utilized by storage system 100, a secret sharing scheme may be implemented by storage controller 110. In one embodiment, Shamir secret sharing may be used by initial master secret generation unit 115 to implement the secret sharing algorithm portion of the overall data protection scheme. However, it is noted that other secret sharing schemes may be utilized in other embodiments. For example, in other embodiments, other secret sharing schemes, such as Blakley, Krawczyk, or the Chinese Remainder Theorem may be utilized. While the remainder of the description may be specific to Shamir secret sharing, it is to be understood this does not preclude the use of other secret sharing schemes.

In one embodiment, unit 115 may be configured to generate 'm' number of shares of which 'k' are needed to reconstruct the initial master secret 120. In one embodiment, the number of shares 'm' may be equal to the number of storage devices 'n'. However, in other embodiments, the number of shares 'm' may be greater than the number of storage devices 'n'. The initial master secret 120 and 'm' number of shares may be generated using any of a variety of well-known techniques which are known to those of ordinary skill in the art.

Each share 135A-N may be distributed to and stored on a corresponding storage device 150A-N. The storage devices 150A-N of storage system 100 are shown as being split up into two equal-sized shelves 140 and 145. However, in other embodiments, other numbers of shelves may be utilized in the storage system, and in addition, each shelf may vary in size.

Although initial master secret generation unit 115, share generation unit 125, final master secret generation unit 126, and key encryption unit 130 are shown as separate entities within storage controller 110, it will be understood that these may be combined into a single unit. It is also noted that storage controller 110 may include other components and logic not shown in FIG. 1. Furthermore, in some embodiments, units 115, 125, 126, and 130 may be software routines that are invoked from a program executing on one or more processors (not shown) of storage controller 110. Generally speaking, the logic, algorithms, and mechanisms described as being included within or implemented by storage controller 110 may comprise hardware and/or software.

It should be understood that the distribution of functionality illustrated in FIG. 1 is shown for illustrative purposes, and other embodiments may have a different arrangement of functionality among the components. For example, in another embodiment, one or more of units 115, 125, 126, and 130 may be located within shelf 140, shelf 145, any storage device 150A-N, or in another computing device. In some embodiments, if the logic for generating shares and secrets and/or encrypting keys is located within a shelf or within a storage device, then the shares, secrets, and/or encrypted keys may not be conveyed from the storage controller to the storage devices 150A-N as shown in FIG. 1. Rather, the shares, secrets, and/or encrypted keys may be utilized locally at their respective storage device after they are generated.

In various embodiments, each of the storage devices 150A-N may utilize any of various types of data storage technology. For example, in one embodiment, one or more of the storage devices 150A-N may include storage consisting of solid-state memory to store persistent data. In other embodiments, one or more of the storage devices 150A-N may include storage using other technologies such as spin torque transfer technique, magnetoresistive random access memory (MRAM) technique, shingled disks, memristors, phase change memory, or other storage technologies. In one embodiment, the included solid-state memory may comprise Solid-State Drive (SSD) technology. It is noted that a Solid-State Drive (SSD) may also be referred to as a Solid-State Disk.

In one embodiment, each storage device 150A-N may generate and utilize a key for encrypting the data that is stored on the device. Each storage device 150A-N may include a hardware encryption mechanism that utilizes the key for encrypting the data stored on the device. Alternatively, the keys utilized by storage devices 150A-N may be generated by storage controller 110 or another unit. In one embodiment, to add an extra level of protection, hardware on the storage devices 150A-N may be configured to encrypt these keys. Each key may be encrypted independently and separately from the other keys by the hardware on each storage device 150A-N. Alternatively, in another embodiment, key encryption unit 130 of storage controller 110 may be configured to encrypt the keys. While key encryption unit 130 is shown as being located within storage controller 110, it is noted that this is shown merely for ease of illustration. In some embodiments, each storage device 150A-N may include its own key encryption unit, and storage controller 110 may provide a value to each device key encryption unit, and the device may use this value to encrypt its key.

Furthermore, each key may be encrypted independently and separately from the data that is encrypted and stored on each storage device. The key for each storage device may be encrypted using both the final master secret 128 and a second value specific to the respective storage device. For example, in one embodiment, the value 165 may be the serial number of the storage device. In another embodiment, the second value may be an identification (ID) or a portion of the ID stored in a header 160 of the storage device. In other embodiments, the second value may be based on other information intrinsic to a given storage device. In further embodiments, multiple device-specific values may be utilized to encrypt the key. Also, in some embodiments, only final master secret 128 may be used to encrypt the key.

It is also noted that in another embodiment, the same key may be utilized by two or more storage devices, and key encryption unit 130 may encrypt this key and convey the encrypted key to the storage devices that use the key. Alternatively, in a further embodiment, final master secret 128 may be the key that is used to encrypt data on each storage device 150A-N. In this embodiment, each storage device 150A-N may store a share 135, external secret access information 162, checksum 164, and the encrypted data 170, along with any other device-specific data in header 160. In this embodiment, to decrypt the data, the shares of a sufficient number of storage devices 150A-N may be used to reconstruct the initial master secret 120. Next, external secret(s) 124 may be retrieved and combined with initial master secret 120 to generate final master secret 128. Final master secret 128 may then be used to decrypt the encrypted data 170.

In one embodiment, a hash function may be utilized to hash the final master secret 128 with the serial number 160 of a given storage device 150 to generate an intermediate value. Then, the value of the original key used to encrypt data on a given storage device 150 may be encrypted by this intermediate value. The output of this encryption stage may be the encrypted key 155 that is stored on the given storage device 150. Any type of hash function (e.g., MD5, SHA-1) may be utilized in various embodiments. In other embodiments, other encryption techniques may be used to generate encrypted key 155 using final master secret 128 and a device-specific value.

In one embodiment, the generation of the initial master secret 120, shares 135A-N, final master secret 128, and encrypted keys 155A-N may be performed during the configuration and installation of storage system 100. In addition, these values may be regenerated on a periodic basis to provide better security for storage system 100. For example, in one embodiment, initial master secret generation unit 115 may generate a new initial master secret 120 on a daily basis and final master secret generation unit 126 may generate a new final master secret 128 on a daily basis. Then, unit 115 may generate new shares 135A-N from the new initial master secret 120 and distribute these to the storage devices 150A-N. Also, unit 130 may generate encrypted keys 155A-N from the new final master secret 128 and distribute these encrypted keys 155A-N to their corresponding storage devices 150A-N. In other embodiments, other schedules may be utilized to update initial master secret 120, final master secret 128, shares 135A-N, and encrypted keys 155A-N.

In one embodiment, storage system 100 may rekey storage devices 150A-N without communicating back to a central authority. Rather, storage controller 110 may cache a copy of external secret(s) 124, or for approaches using a USB key token, storage controller 110 may pass a newly-generated initial master secret through the token again. Once a new final master secret is generated, storage controller 110 may rekey storage devices 150A-N.

In other embodiments, the steps utilized during the generation of the secrets and keys may vary, and other steps may be incorporated in the updating of the data protection scheme. For example, in another embodiment, instead of just re-encrypting the original key to produce a new encrypted key 155, the encrypted data on each storage device 150 may be decrypted and re-encrypted with a new key. Also, in a further embodiment, the original keys used for encrypting data stored on each of storage devices 150A-N may be generated by key generation unit 130 instead of being generated by each storage device.

Storage device 150N is expanded in FIG. 1 to show its separate data components. In one embodiment, storage device 150N may include a device-specific value 165N, share 135N, encrypted key 155N, external secret access info 162N, checksum 164N, and encrypted data 170N. Device-specific value 165N, share 135N, and encrypted key 155N, external secret access info 162N, and checksum 164N may be part of header 160N. Alternatively, in another embodiment, encrypted key 155N may be stored on storage device 150N in an area inaccessible to the end user. In this embodiment, encrypted key 155N may only be accessible via an unlock command. Header 160N may also include other information not shown in FIG. 1. It is noted that storage device 150N may be formatted differently in other embodiments. Additionally, storage device 150N may include logic (not shown) for performing encryption.

The format of storage device 150N as shown in FIG. 1 is a format of the data stored in non-volatile memory (e.g., solid state storage, disk drives, or any other suitable storage device). Although not shown in FIG. 1, storage device 150N may also include volatile memory for storing a decrypted key with which reads and writes may be executed. Generally speaking, storage device 150N may use the decrypted key during the reading and writing of data to storage device 150N. When storage device 150N is powered up, there may be an initialization process to get storage device 150N into an operational state. This operational state may allow for the encrypted data 170N to be decrypted and also allow new data to be encrypted and written to storage device 150N. On power up, storage device 150N may retain encrypted key 155N, which is non-useable until it is decrypted to recreate the original key which was used to encrypt the data (encrypted data 170N) stored on device 150N. This process is described in more detail in relation to FIG. 2.

Share 135N may be generated by share generation unit 125. The generation of share 135N may be performed independently and separately from the encryption of the actual data (encrypted data 170N). In other words, user data stored on the storage device 150N is not used in the generation of share 135N. In one embodiment, share 135N may be an input to a polynomial and a result of the polynomial for that particular input. In some embodiments, share 135N may also include additional information. For example, in one embodiment, share 135N may include the value of 'k', which indicates the number of shares that are required to reconstruct shared secret 120.

In one embodiment, the data stored on the storage device may be encrypted with a key unique to the storage device. The encrypted data of storage device 150N is represented by encrypted data 170N. The key, along with another value specific to the storage device, may be conveyed from each storage device 150 to key encryption unit 130. For example, in one embodiment, storage controller 110 may receive a key and device-specific value 165N from each storage device 150. The key, device-specific value 165N, and final master secret 128 may be utilized by key encryption unit 130 to generate an encrypted key 155 for the specific storage device 150. In another embodiment, each storage device may be configured to encrypt its respective key locally, and therefore the result of combining final master secret 128 with device-specific value 165N may be conveyed to each storage device in this embodiment. Further variations in the locations and methods of encrypting the keys are possible and are contemplated.

Figure 2:
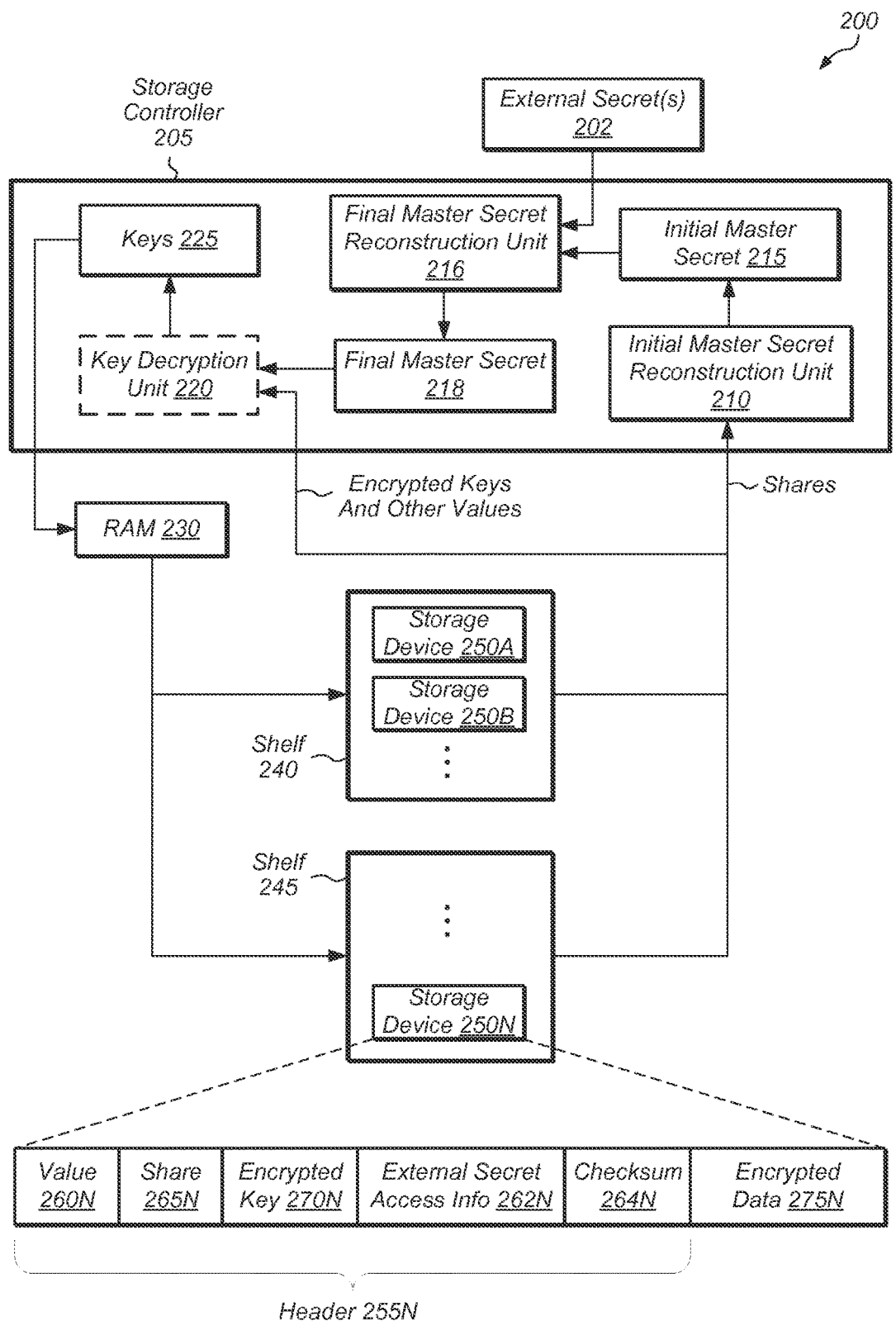
FIG. 2 is a generalized block diagram of another embodiment of a storage system.

Referring now to FIG. 2, a block diagram of another embodiment of a storage system 200 is shown. Storage system 200 includes storage controller 205, and the actual logic used to implement the units shown in storage controller 205 may vary depending on the embodiment. In various embodiments, storage controller 205 may be implemented using hardware, software, or a combination thereof. For example, in one embodiment, units 210, 216, and 220 may represent software that is executed by one or more processors (not shown) of storage controller 205. Furthermore, the logic shown in storage controller 205 may be located within shelves 240 and 245 or storage devices 250A-N in other embodiments.

Storage controller 205 may be coupled to shelves 240 and 245 which include storage devices 250A-N. Storage device 250N is expanded in FIG. 2 to show header 255N and encrypted data 275N. Header 255N may include device-specific value 260N, share 265N, encrypted key 270N, external secret access info 262N, and checksum 264N. Storage controller 205 may also be coupled to random-access memory (RAM) 230.

Storage controller 205 may include initial master secret reconstruction unit 210 and final master secret reconstruction unit 216. Unit 210 may be configured to receive shares from storage devices 250A-N. As long as enough storage devices are present and accessible, unit 210 may reconstruct initial master secret 215 from the shares obtained from these storage devices. Also, storage controller 205 may obtain the one or more external secrets 202 prior to, in parallel with, or after reconstructing initial master secret 215. Storage controller 205 may then proceed through the external secrets 202 in a predetermined order, transforming the initial master secret 215 by each external secret in turn. Then, storage controller 205 may validate final master secret 218 using checksum 264N and proceed only if final master secret 218 matches the expected checksum 264N. This final master secret 218 may then be used to generate the per-device encryption keys 225 to unlock each storage device 250A-N.

In other embodiments, storage controller 205 may also include many other units and other logic for performing other tasks. For example, storage controller 205 may also include other logic not shown in FIG. 2, such as the logic shown in storage controller 110 of FIG. 1. In various embodiments, storage controller 205 may be part of a server or computing device, and storage controller 205 may include hardware (e.g., circuitry, dedicated logic, programmable logic, microcode), software (e.g., executable program instructions), or any combination thereof.

The operations of reconstructing final master secret 218 and decrypting the encrypted keys 270 may be performed a single time on boot up of the storage system 200. After the encrypted keys 270 have been decrypted, they may be stored in a volatile memory (RAM 230) and used multiple times for accesses to storage devices 250A-N. It is noted that this is an advantageous feature of storage system 200 which allows for final master secret 218 to be reconstructed and encrypted keys 270 to be decrypted a single time and then reused multiple times.

Key decryption unit 220 may be configured to decrypt the encrypted keys of storage devices 250A-N. Unit 220 may receive encrypted keys and device-specific values from each of the storage devices 250A-N. Unit 220 may use final master secret 218 and the device-specific value from a specific storage device to reverse the encryption process that was used to encrypt the key. Keys 225 are representative of decrypted keys that may be used to decrypt the encrypted data 275 that is stored on the storage device 250A-N. Each storage device 250A-N may have a separate key that is used to encrypt and decrypt the data stored on the individual device. Although key decryption unit 220 is shown as being located in storage controller 205, it is noted that in some embodiments, each storage device 250A-N may include its own key decryption unit. For example, in one embodiment, the device-specific key may be generated in storage controller 205 and passed to a storage device 250 to decrypt the encrypted key 270 via the serial advanced technology attachment (SATA) unlock command. In other embodiments, the functionality of key decryption unit 220 may be split between storage controller 205 and storage devices 250A-N.

Keys 225 may be stored in a variety of locations, depending on the embodiment. Although keys 225 are shown as being stored in storage controller 205, in another embodiment, keys 225 may be stored in RAM 230. In addition, although RAM 230 is shown as a separate unit from storage controller 205, in another embodiment, RAM 230 may be included within storage controller 205. In a further embodiment, each storage device 250A-N may include internal RAM 230 for storing decrypted keys 225.

RAM 230 may be any type of volatile memory such that when RAM 230 is powered down, the keys will not be saved. This helps to prevent an unauthorized user from accessing the keys after they have been decrypted. Each storage device 250A-N may retrieve a corresponding key from RAM 230 and use this key to encrypt and decrypt data during reads and writes from the storage device. Alternatively, each storage device 250A-N may include a portion of volatile memory, and a key may be stored in this volatile memory on the corresponding storage device. Other possibilities of locations for storing the decrypted keys are possible and are contemplated. In one embodiment, the key decryption process may take place entirely on each storage device 250A-N. In this embodiment, storage controller 205 may provide final master secret 218 to each storage device 250A-N to enable each device to decrypt its corresponding encrypted key 270.

In various embodiments, one or more of the storage devices 250A-N may fail during operation of the overall storage system 200. In response to such a failure, storage controller 205 may be configured to generate a new share for a new storage device that replaces a failed storage device. As part of the process of generating a new share, storage controller 205 may gather sufficient shares to recover the master secret. For example, in one embodiment, when master secret 215 is derived from a polynomial, the required number of shares may be used to solve for all of the coefficients of the polynomial. Then, the polynomial may be evaluated at a different point to generate a new share for the new storage device. For other types of secret sharing schemes, appropriate processes may be utilized to generate a new share for a new storage device that replaces a failed storage device. In another embodiment, storage controller 205 may be configured to generate a new initial master secret and a new final master secret whenever membership changes, such as when an existing storage device fails or when a new storage device is added to the system. Then, the new final master secret may be used to refresh encrypted keys and shares on all of the storage devices. Alternatively, storage controller 205 may generate a new set of shares from the same secret which was previously used.

Many different techniques may be used to destroy data in storage system 200 to prevent unauthorized access. For example, if enough storage devices are destroyed, then it would be impossible to retrieve enough shares to reconstruct initial master secret 215. However, destroying storage devices may be time-consuming, and so the external secret(s) 202 may be destroyed or made inaccessible. For example, if a USB key token is destroyed, the external secret stored on it is no longer accessible, and system 200 will not be able to complete the process of gaining access to the stored data. Similarly, if shelves 240 and 245 are stolen, a remote network server may refuse to provide a needed external secret, which would prevent completion of the steps necessary to access data. Therefore, destruction of the data stored in system 200 may be accomplished by removing power to system 200 and by destroying the means of access to at least one required external secret.

While the above-described steps prevent attackers from accessing stored data, these steps are reversible. If storage system 200 is later recovered, the external secrets 202 may be restored from backup copies. This may be useful if storage system 200 is normally kept in a secure environment but must be sent in a single piece through hostile environments. The external secrets may be sent through an alternate, more secure path, and then reunited with the storage system at the destination. This approach also allows for recovery from accidental loss of the external secrets 202. If a USB key token suffers a hardware failure, another token with the same secret can be used to replace it. Similarly, if a USB key token is mistakenly destroyed, the data in the system is not lost, but can be recovered by obtaining another key token with the same secret. Organizations can thus store extra tokens or secrets in highly secure locations, providing replacements as needed.

Since access to external secrets 202 is necessary to boot storage system 200, in some embodiments, redundant copies of each external secret 202 may be maintained. For example, system 200 may use two USB key tokens, configured identically, to provide redundancy in case one of the tokens fails. An organization could also provide two or more network servers to provide external secrets in case one server is unavailable.

Figure 3:
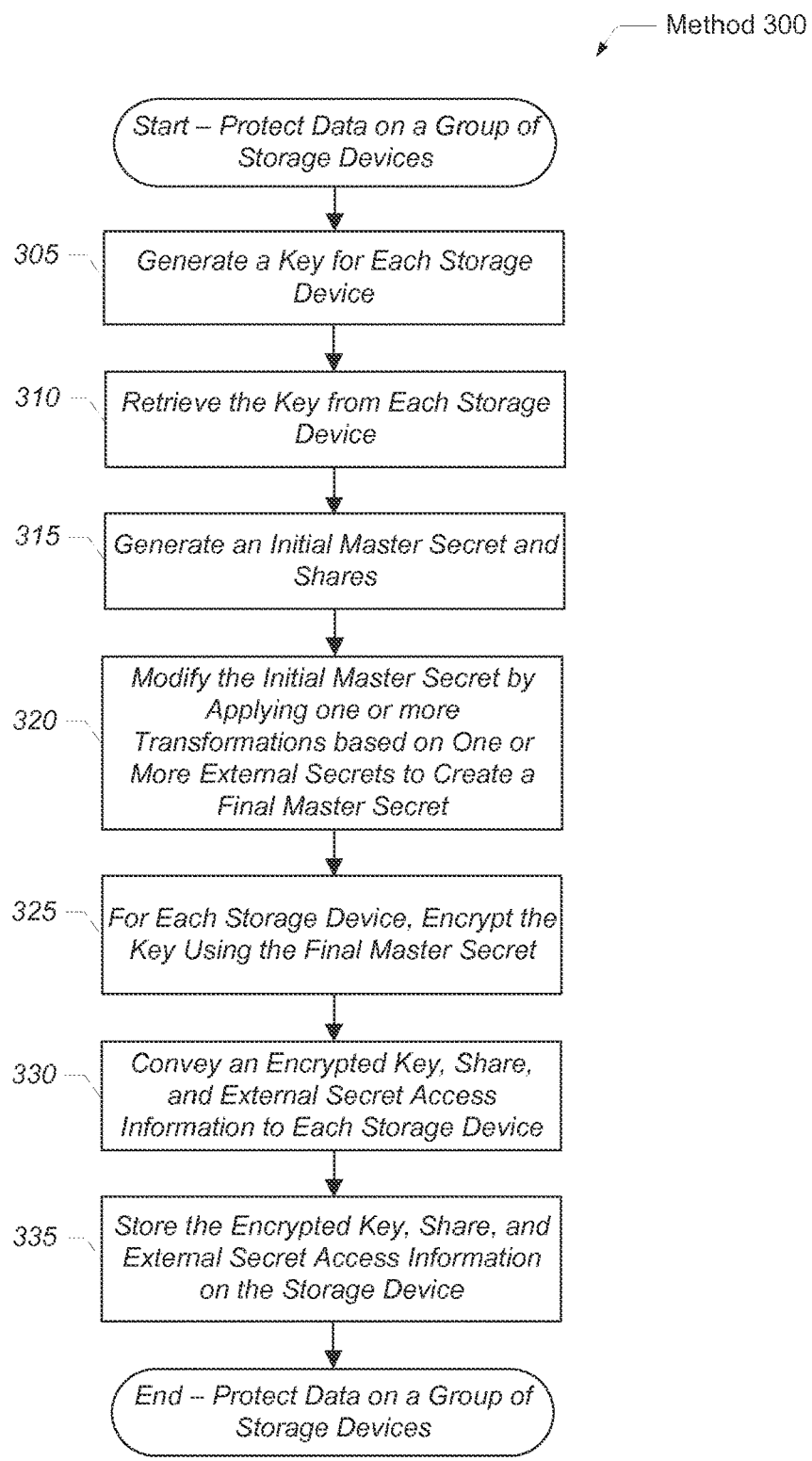
FIG. 3 is a generalized flow diagram illustrating one embodiment of a method for protecting data on a group of storage devices.

Turning now to FIG. 3, one embodiment of a method for protecting data on a group of storage devices is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, method 300 may begin with each storage device of the group of storage devices generating a key (block 305). In one embodiment, each storage device may generate the key independently of the other storage devices, and the key may be a randomly generated number. Also, in one embodiment, each storage device may perform the key generation without any input or control from a storage controller or central management unit. The key may be used by each storage device to encrypt data as data is written to the storage device. Each storage device may include hardware configured to use the key to encrypt data. The key may also be used to decrypt data as data is read from the storage device. In another embodiment, keys may be generated elsewhere (e.g., storage controller) and conveyed to each storage device.

Next, a storage controller may retrieve the key from each storage device (block 310). In some embodiments, a per-device value may be retrieved from each storage device and utilized for encrypting the per-device key. This value may be any value that is unique to the specific storage device. For example, in one embodiment, the per-device value may be a serial number of the storage device. The storage controller may be any type of centralized management unit configured to manage the group of storage devices and/or control access to the group of storage devices. In various embodiments, the storage controller may comprise hardware and/or software. For example, in one embodiment, the storage controller may be software executing on one or more processors of a computing device.

The storage controller may generate a single initial master secret for the entire group and a share for each storage device (block 315). It is noted that in some embodiments, the storage controller may generate an initial master secret and shares for each storage device prior to retrieving the random key and other value from each storage device. The storage controller may utilize any of a variety of secret sharing schemes to generate the initial master secret and shares. For example, in one embodiment, the storage controller may utilize Shamir's secret sharing scheme to generate the initial master secret and the individual shares.

Next, the storage controller may modify the initial master secret by applying one or more transformation based on one or more external secrets to create a final master secret (block 320). The external secret(s) may be a user entered password, USB key, key stored on an external server, other secret, or any combination thereof, including multiple instances of a single type of secret. For example, in one embodiment, two different USB keys may be utilized to store two external secrets, and transformations based on both of the external secrets may be utilized to create the final master secret from the initial master secret. For each storage device, the storage controller may utilize the final master secret to encrypt the storage device's key (block 325). In some embodiments, the final master secret may be used in a combination with a device-specific value to encrypt the storage device's key. In one embodiment, the device-specific value may be a serial number of the storage device. In one embodiment, the final master secret and the serial number may be hashed together and then this value may be used to encrypt the storage device's key. In other embodiments, other encryption schemes may be used to encrypt the key based on the final master secret and the device-specific value. In some embodiments, the final master secret by itself may be used to encrypt the storage device's key, rather than using both the final master secret and the device-specific value.

Next, the storage controller may convey a corresponding encrypted key, share, and external secret access information to each storage device in the group of storage devices (block 330). The share, encrypted key, and external secret access information may be stored on the storage device (block 335). In one embodiment, the share and external secret access information may be stored in the header of the storage device while the encrypted key may be stored on the storage device in an area inaccessible to the end user. In this embodiment, the encrypted key may only be accessible via an unlock command. In some embodiments, each storage device may store a checksum which is used to validate the final master secret. After block 335, method 300 may end.

Figure 4:
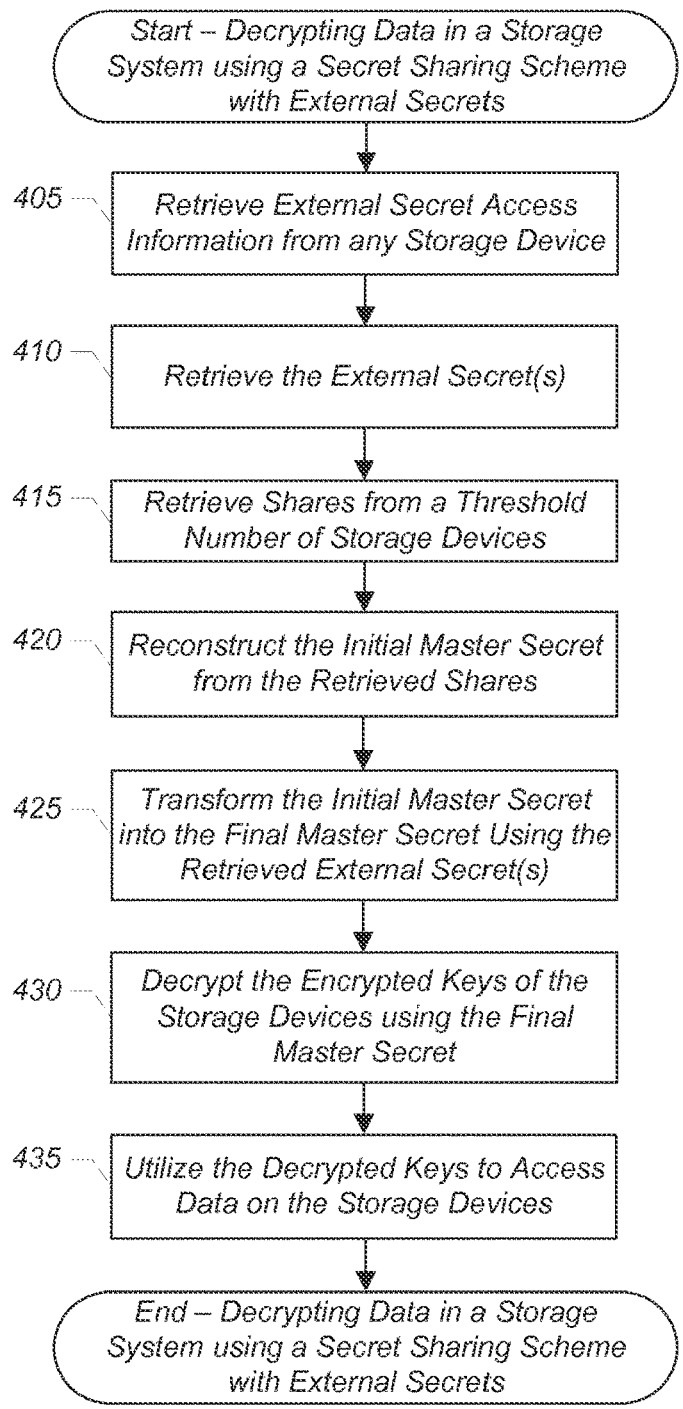
FIG. 4 is a generalized flow diagram illustrating one embodiment of a method for decrypting data in a storage system using a secret sharing scheme with external secrets.

Turning now to FIG. 4, one embodiment of a method for decrypting data in a storage system using a secret sharing scheme with external secrets is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 400 may begin with the storage controller retrieving external secret access information from any storage device (block 405). The external secret access information may identify the one or more external secrets and also indicate how to retrieve these one or more external secrets. The external secret(s) may vary depending on the embodiment. For example, in various embodiments, the external secret(s) may be a password, USB key token, secret stored on an external server, or other type of secret. Next, using this external secret access information, the storage controller may retrieve the external secret(s) (block 410).

Also, the storage controller may retrieve shares from a threshold number of storage devices (block 415). The value of the threshold may be determined by the manner in which the initial master secret was generated. Next, the initial master secret may be reconstructed from the retrieved shares (block 420). In one embodiment, polynomial interpolation may be utilized to reconstruct the initial master secret. More specifically, Lagrange basis polynomials may be computed from the shares as part of the interpolation process used to reconstruct the initial master secret. It is noted that blocks 415 and 420 may be performed in parallel with blocks 405 and 410, or alternatively, blocks 415 and 420 may be performed prior to blocks 405 and 410.

Next, the initial master secret may be transformed into the final master secret using the retrieved external secret(s) (block 425). In one embodiment, a secure hardware token may include an interface that allows the token to accept a value and return a transformed value. The transformation could be encryption, a keyed hash, or other type of transformation. In such an embodiment, the initial master secret may be transformed by presenting it to the token and using the returned value as the final master secret. The token could be easily destroyed by physically damaging the token to prevent access to the storage array.

In another embodiment, an external secret may be stored on one or more network servers. The servers could be in a more protected environment than the storage array, and if the array were stolen, the network server could simply refuse to provide the external secret(s) to any requester, preventing a stolen array from being read. In a further embodiment, the external secret may be a password which is entered directly to the storage system, through a keyboard or other input device. This password could be requested when the storage system starts up, before any attempt is made to rebuild the initial master secret. The storage system could then maintain the password in RAM until it is needed.

After block 425, the encrypted keys of the storage devices of the storage system may be decrypted using the final master secret (block 430). For a given storage device, decrypting the encrypted key may also require a value specific to the given storage device. By using a value specific to the given storage device, each different storage device will have a different key. However, the use of a device-specific value is optional for the schemes disclosed herein. In one embodiment, this device-specific value may be a serial number of the given storage device. In other embodiments, the device-specific value may be a different attribute of the given storage device (or value otherwise associated with the storage device), such as some piece of data stored in the storage device header. In a further embodiment, the device-specific value may be based on a combination of values, such as a device ID, one or more values stored in the header of the device, and any other suitable value. In a still further embodiment, a device-specific value may not be utilized to decrypt the encrypted key for a given storage device.

After block 430, the decrypted keys may be used for decrypting data on the storage devices of the storage system (block 435). The decrypted keys may also be used for encrypting data that is written to the storage devices. The decrypted keys may be stored in volatile memory such that when the system is powered down, the decrypted keys may be lost. On a reboot, the system may go through method 400 again to decrypt the encrypted keys of the storage devices in the storage system. After implementing method 400 a single time, the decrypted keys may be used for decrypting multiple stored blocks of data (for reads) and/or encrypting multiple blocks of new data being stored in the storage system (for writes).

Figure 5:
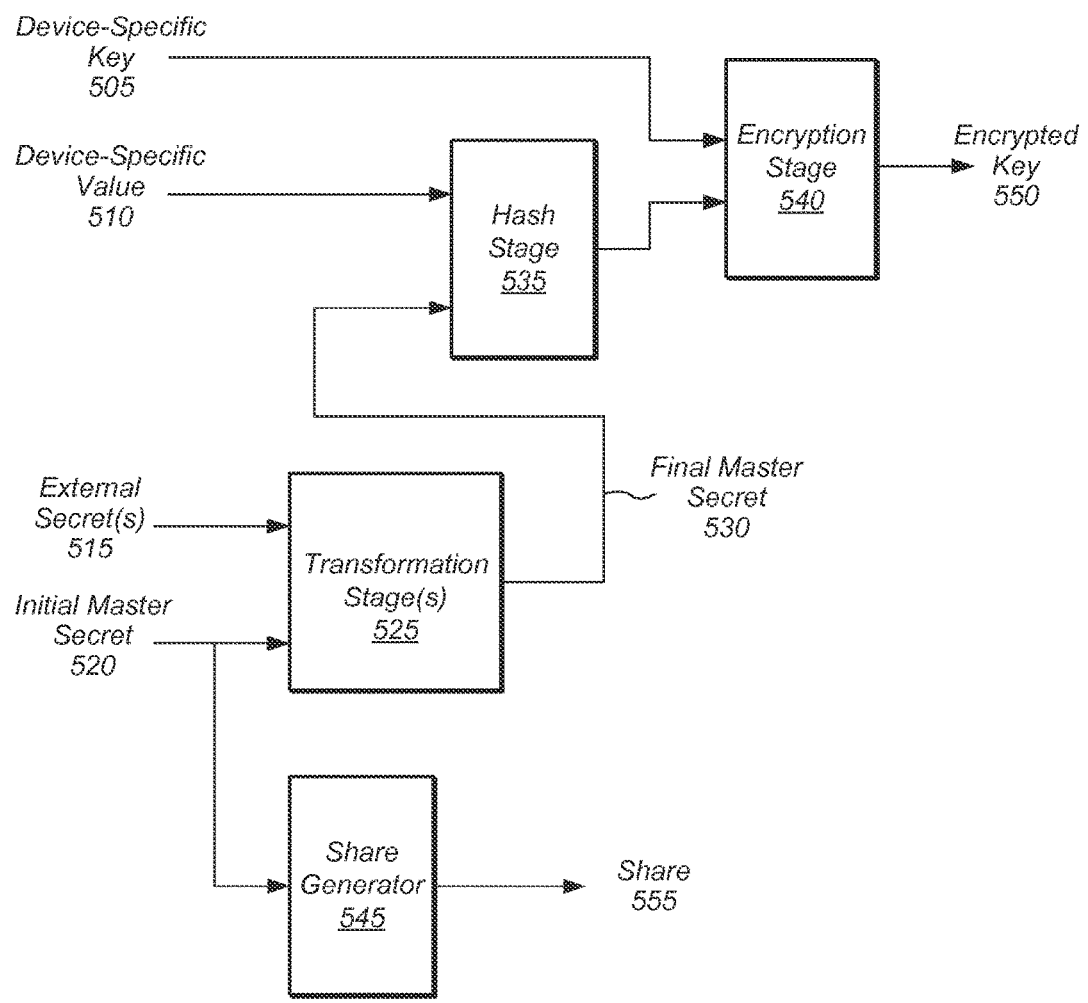
FIG. 5 is a block diagram of one embodiment of the generation of an encrypted key and a share.

Referring now to FIG. 5, a block diagram of one embodiment of the generation of an encrypted key and a share is shown. The block diagram illustrates the generation of an encrypted key and share for each storage device (not shown) of an overall storage system (not shown). Device-specific key 505 is representative of a key that is used to encrypt data stored on a specific storage device. Device-specific value 510 is representative of any value or combination of values unique to the specific storage device. External secret(s) 515 are representative of one or more external secrets which may be used to provide extra protection for data stored in the storage system. Initial master secret 520 is representative of a shared secret which is capable of being split into a plurality of shares.

Initial master secret 520 may be transformed into final master secret 530 using external secret(s) 515, as shown by transformation stage(s) 525. Transformation stage 525 may include encryption, keyed hashing, an XOR operation, and/or other types of transformations, depending on the embodiment. Device-specific value 510 and final master secret 530 may be input to hashing stage 535, and a hashed value may be generated from these two inputs. Hashing stage 535 may utilize any type of hash function to hash together value 510 and final master secret 530. The output from hashing stage 535 may be coupled as an input to encryption stage 540. Encryption stage 540 may use the output of hashing stage 535 to encrypt the original key 505. The output of encryption stage 540 may be encrypted key 550 which may be stored on its corresponding storage device. Encryption stage 540 may utilize any suitable type of encryption to generate encrypted key 550.

Share generator 545 may be configured to generate share 555 from initial master secret 520. In some embodiments, share generator 530 may be configured to generate multiple shares 555 for a single storage device. In one embodiment, share generator 545 may generate a point on a polynomial for each share 555. In other embodiments, share 555 may be generated utilizing other techniques. The diagram shown in FIG. 5 illustrates the operations that may be performed for a single storage device. For a storage system with a plurality of storage devices, these operations may be repeated for each storage device in the system. An encrypted key 550 and share 555 may be generated for each storage device, and then both the encrypted key 550 and share 555 may be stored on their corresponding storage device. A separate key 505 and separate device-specific value 510 may be utilized for each separate storage device, but the same initial master secret 520 and external secret(s) 515 may be utilized for all of the storage devices in the system.

It is to be understood that FIG. 5 is intended as a logical representation of one possible embodiment of the generation of an encrypted key and share for a storage device. In other embodiments, other suitable mechanisms or methods for generating shares and encrypted keys may be utilized. The various functions shown in FIG. 5 may be performed by hardware and/or software within a storage controller, by hardware and/or software on a storage device, or by any combination thereof.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising a plurality of storage devices, wherein the computing system is configured to:
reconstruct an initial master secret using a threshold number of shares of a plurality of shares retrieved from the plurality of storage devices;
transform the initial master secret into a final master secret using one or more external secrets, wherein the one or more external secrets are stored separately from the computing system;
use the final master secret and a plurality of device specific values to decrypt a plurality of unique device keys stored on the plurality of storage devices including for each storage device, use the final master secret and a device specific value that is specific to the hardware of the storage device to decrypt a unique device key that is stored on the storage device; and
for each storage device of the plurality of storage devices:
decrypt data on the storage device with one of the decrypted unique device keys, wherein the unique device key that decrypts the data on one storage device is different than any other unique device key that decrypts data on any other storage device of the plurality of storage devices;
encrypt data on the storage device with the unique device key, wherein the unique device key that encrypts the data on one storage device is different than any other unique device key that encrypts data on any other storage device; and
encrypt each device key using the final master secret and a particular device-specific value that is specific to the computing device;
store information on how to retrieve the one or more external secrets, wherein the information is stored on at least one storage device of the plurality of storage devices; and
store a checksum on at least one storage device, wherein the checksum is used to validate the final master secret.

2. The computing system as recited in claim 1, wherein the computing system is further configured to:
store a corresponding encrypted device key on each storage device; and
store a separate share of the plurality of shares on each storage device of the plurality of storage devices.

3. The computing system as recited in claim 1, further comprising a server configured to:
store the one or more external secrets; and
destroy data stored in the computing system by making the one or more external secrets inaccessible.

4. The computing system as recited in claim 1, wherein the one or more external secrets are stored on a universal serial bus (USB) key token, smart card, or remote server, and the computing system is further configured to:
for each computing device, encrypt each device key using the final master secret and a particular device-specific value that is specific to the storage device.

5. A method comprising:
reconstructing an initial master secret using a threshold number of shares of a plurality of shares retrieved from the plurality of storage devices;
transforming the initial master secret into a final master secret using one or more external secrets, wherein the one or more external secrets are stored separately form the computing system;
using the final master secret and a plurality of device specific values to decrypt a plurality of unique device keys stored on the plurality of storage devices including for each storage device, use the final master secret and a device specific value that is specific to the hardware of the storage device to decrypt a unique device key that is stored on the storage device; and
for each storage device of the plurality of storage devices:
decrypting data on the storage device with one of the decrypted unique device keys, wherein the unique device key that decrypts the data on one storage device is different than any other unique device key that decrypts data on any other storage device of the plurality of storage devices;
encrypting data on the storage device with the unique device key, wherein the unique device key that encrypts the data on one storage device is different than any other unique device key that encrypts data on any other storage device; and
encrypt each device key using the final master secret and a particular device-specific value that is specific to the computing device;
store information on how to retrieve the one or more external secrets, wherein the information is stored on at least one storage device of the plurality of storage devices; and
store a checksum on at least one storage device, wherein the checksum is used to validate the final master secret.

6. The method as recited in claim 5, further comprising:
storing a corresponding encrypted device key on each storage device; and
storing a separate share of the plurality of shares on each storage device of the plurality of storage devices.

7. The method as recited in claim 5, further comprising:
storing the one or more external secrets on a server; and
destroying data stored in the computing system by making the one or more external secrets inaccessible from the server.

8. The method as recited in claim 5, wherein the one or more external secrets is stored on a universal serial bus (USB) key token, smart card, or remote server, and the method further comprises:
for each computing device, encrypting each device key using the final master secret and a particular device-specific value that is specific to the computing device.

9. A non-transitory computer readable storage medium comprising program instructions, wherein the program instructions are executable to:
reconstruct an initial master secret using a threshold number of shares of a plurality of shares retrieved from the plurality of storage devices;
transform the initial master secret into a final master secret using one or more external secrets, wherein the one or more external secrets are stored separately form the computing system;

use the final master secret and a plurality of device specific values to decrypt a plurality of unique device keys stored on the plurality of storage devices including for each storage device, use the final master secret and a device specific value that is specific to the hardware of the storage device to decrypt a unique device key that is stored on the storage device; and for each storage device of the plurality of storage devices:
decrypt data on the storage device with one of the decrypted unique device keys, wherein the unique device key that decrypts the data on one storage device is different than any other unique device key that decrypts data on any other storage device of the plurality of storage devices;
encrypt data on the storage device with the unique device key, wherein the unique device key that encrypts the data on one storage device is different than any other unique device key that encrypts data on any other storage device; and
encrypt each device key using the final master secret and a particular device-specific value that is specific to the computing device;

store information on how to retrieve the one or more external secrets, wherein the information is stored on at least one storage device of the plurality of storage devices; and store a checksum on at least one storage device, wherein the checksum is used to validate the final master secret.

10. The non-transitory computer readable storage medium as recited in claim 9, wherein the program instructions are further executable to:
store a corresponding encrypted device key on each storage device; and
store a separate share of the plurality of shares on each storage device of the plurality of storage devices.

11. The non-transitory computer readable storage medium as recited in claim 9, wherein the program instructions are further executable to:
store the one or more external secrets on a server; and
destroy data stored in the computing system by making the one or more external secrets inaccessible from the server.

* * * * *